(12) United States Patent
Hu

(10) Patent No.: US 11,674,827 B2
(45) Date of Patent: Jun. 13, 2023

(54) SATURATION CAUSED PHASE JUMP AVOIDANCE IN DAS

(71) Applicant: NEC Laboratories America, Inc., Princeton, NJ (US)

(72) Inventor: Junqiang Hu, Davis, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/511,381

(22) Filed: Oct. 26, 2021

(65) Prior Publication Data

US 2022/0128384 A1  Apr. 28, 2022

Related U.S. Application Data

(60) Provisional application No. 63/105,984, filed on Oct. 27, 2020.

(51) Int. Cl.
*G01D 5/353* (2006.01)

(52) U.S. Cl.
CPC ............................ *G01D 5/35361* (2013.01)

(58) Field of Classification Search
CPC ........... G01D 5/35361; G01D 5/35358; G01D 5/35306; G01D 5/35335; G01D 5/268; G01D 5/35345; G01D 5/35354; G01H 9/004

See application file for complete search history.

(56) References Cited

U.S. PATENT DOCUMENTS

| | | | |
|---|---|---|---|
| RE42,236 E * | 3/2011 | Geile | H03M 13/356 370/480 |
| 2017/0045410 A1* | 2/2017 | Crickmore | G01K 11/32 |
| 2019/0025094 A1* | 1/2019 | Lewis | G01D 5/35361 |
| 2019/0226885 A1* | 7/2019 | Rowen | G01D 5/353 |
| 2020/0408572 A1* | 12/2020 | Ronnekleiv | G01D 5/35306 |
| 2022/0299481 A1* | 9/2022 | Ooi | H04B 10/071 |

* cited by examiner

*Primary Examiner* — Jennifer D Bennett
*Assistant Examiner* — Erin R Garber
(74) *Attorney, Agent, or Firm* — Joseph Kolodka

(57) ABSTRACT

Aspects of the present disclosure describe systems methods and structures for avoiding saturation caused phase jump in systems that extract information from the phase of a complex sequence and exhibit an overflow or "spike" in the output of a high-pass filter. Operationally, during phase unwrapping—when an output signal exceeds a supported range—it is adjusted to be back in range by adding N·2π, to a phase where N is negative or positive integer, depending on the direction to be adjusted.

4 Claims, 10 Drawing Sheets

SATURATION CAUSED PHASE JUMP AVOIDANCE IN DAS

CROSS REFERENCE

This disclosure claims the benefit of U.S. Provisional Patent Application Ser. No. 63/105,984 filed Oct. 27, 2020 the entire contents of which is incorporated by reference as if set forth at length herein.

TECHNICAL FIELD

This disclosure relates generally to distributed optical fiber sensing (DOFS) systems, methods, and structures. More particularly it pertains to systems, methods, and structures that provide saturation caused phase jump avoidance in coherent distributed acoustic sensing (DAS).

BACKGROUND

Distributed acoustic sensing (DAS) using coherent Rayleigh backscattering in an optical fiber has become a ubiquitous technique for monitoring multiple dynamic events in real time, due to its useful application in numerous safety security, and integrity monitoring systems. As such, improvements in the technique would be a welcome addition to the art.

SUMMARY

An advance in the art is made according to aspects of the present disclosure directed to systems, methods, and structures for avoiding saturation caused phase jump in DAS systems that extract information from the phase of a complex sequence and exhibit an overflow or "spike" in the output of a high-pass filter during unwrapping.

According to an aspect of the present disclosure and in sharp contrast to the prior art, during phase unwrapping—when an output signal exceeds a supported range, it is adjusted to be back in range by adding $N \cdot 2\pi$, to a phase where N is negative or positive integer, depending on the direction to be adjusted.

The adjusted phase, together with a flag signal, are outputted to the High Pass Filter (HPF) and buffered $x(n-m)$ samples where $m=0, 1, 2, \ldots$ in the HPF are replaced by $x'(n-m)=x(n-m)+N \cdot 2\pi$, to eliminate any spike(s) in the output.

BRIEF DESCRIPTION OF THE DRAWING

A more complete understanding of the present disclosure may be realized by reference to the accompanying drawing in which.

Figure 1:
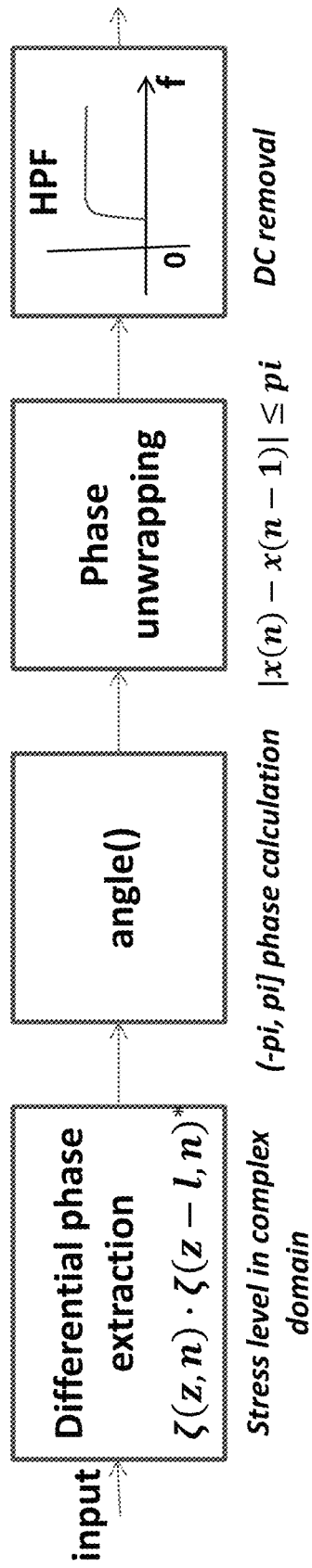
FIG. 1 is a schematic flow chart diagram of an illustrative coherent DAS processing procedure according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

We begin my noting that coherent detection of Rayleigh backscattered signal(s) with differential phase extraction is a well-known technique that is popularly used in distributed acoustic sensing (DAS) due in part to its advantages in sensitivity, linear phase response to longitudinal stress, and possible unlimited phase range.

As will be understood and appreciated by those skilled in the art, phase determination and calculations with respect to a complex signal usually takes multiple process steps.

First, calculate the angle $\varphi(z, n)$ in $(-\pi, \pi]$ range from (real(S(z, n)), imag(S(z, n))), where $S(z, n) = \zeta((z, n) \cdot \zeta(z-l, n)^*$ is the complex signal containing the differential phase information at location z, time n, by using arc tangent (a tan ( )) and consider the sign of the input.

Second, unwrap $\varphi(z,n)$, to have $x(z, n)$ that $x(z, n)-x(z, n-1)$ (for any n) falls in $(-\pi, \pi]$ range.

A high-pass filter (HPF) usually follows the unwrapped phase to remove the DC, for either vibration detection or other purposes. This procedure is shown schematically in FIG. 1.

We note that in practice—for several reasons—the unwrapped phase has only limited range, and the output may reach/exceed that range and cause overflow. One reason is due to available processing resource, the output signal has only limited number of bits, especially when implemented in firmware using fixed-point processing.

Another reason is, for the unwrapped phase itself, because of random walk caused by noise, or ultra-large fiber stress level, or other factors such as laser phase drift, it may move towards one direction and eventually reach the maximum range.

Once the unwrapped phase reaches the maximum (either positive or negative), there are two options of handling namely, either stay at the maximum range (i.e., stay saturated) and wait until signal goes towards the opposite direction, or pull it back to the normal range, such as reset to 0, or change to $(-\pi, \pi]$ range using the unwrapped value.

Remaining in a saturated state disables the ability of detecting the signal because it becomes flat, while pulling the unwrapped signal back to normal range causes a large step between two samples, which causes strong spike at the HPF output. This spike may be wrongfully treated as a vibration.

Figure 2:
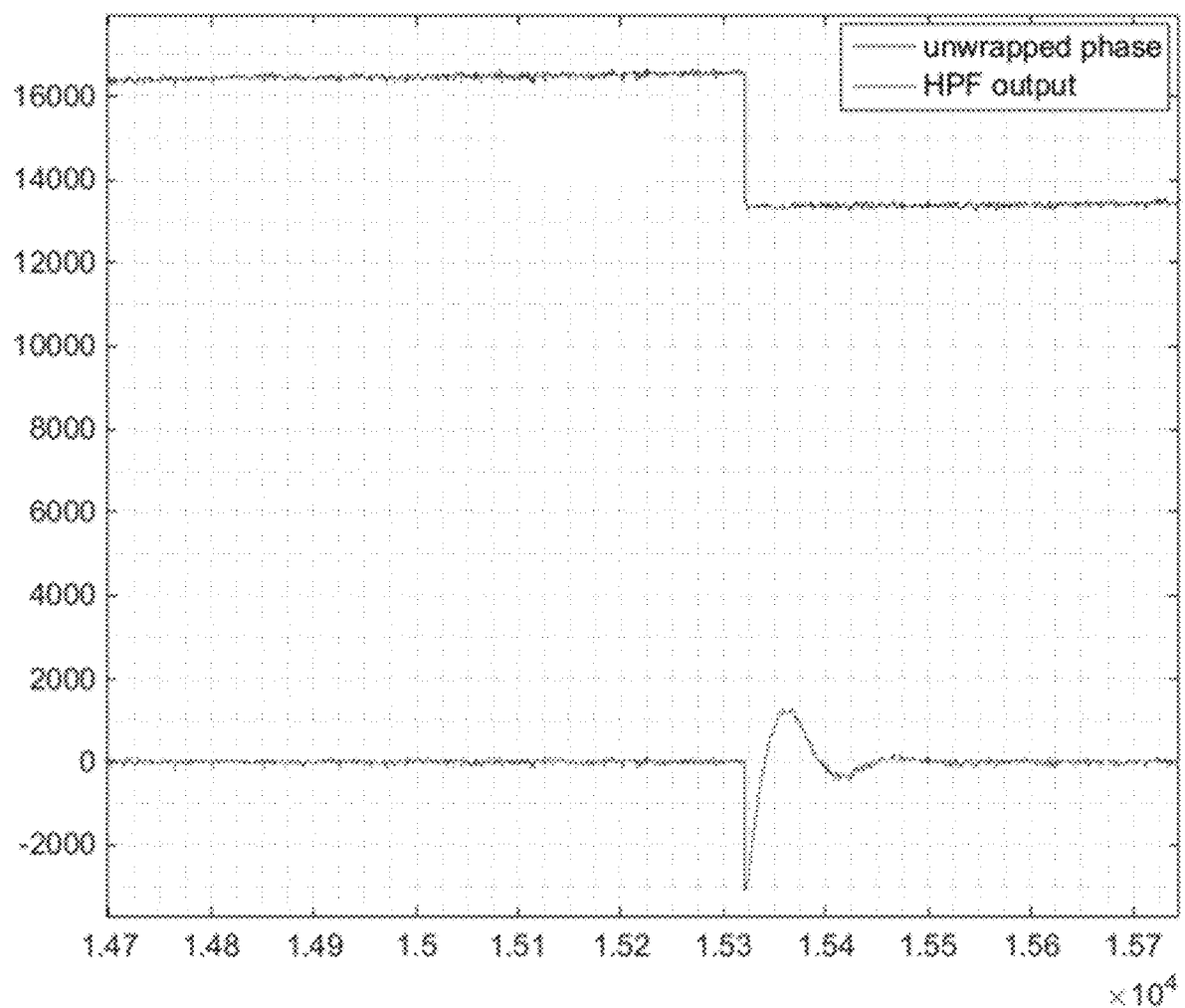
FIG. 2 is a plot illustrating an unwrapped phase saturation adjustment and corresponding spike at high pass filter (HPF) output according to aspects of the present disclosure.

FIG. 2 is a plot illustrating an unwrapped phase saturation adjustment and corresponding spike at high pass filter (HPF) output according to aspects of the present disclosure.

As the example given in FIG. 2 shows in which the x-axis is sequence or time n of the sample and y-axis is the amplitude—the upper line is unwrapped phase, and the lower line is the corresponding output passing through a high-pass filter to remove the DC. The large step in the upper line happens at the time that the unwrapped phase saturates, and the algorithm pulls it back to the normal range by subtracting $2\pi$. As can be seen from the lower line that this large step causes a strong spike followed by a long ripple at the HPF output.

As we shall show and describe, one aspect of the present disclosure describes a method that eliminates the spike from the HPF output when the case is as that shown in FIG. 2. To simplify the discussion, the following considers a fixed location z, unless otherwise specified.

Phase Unwrapping Output

When the unwrapped phase saturates, the method according to aspects of the present disclosure adjusts the output by subtracting or adding $2\pi$, which will have $x(n)-x(n-1)$ in range of $(-\pi-2\pi, \pi-2\pi]$ or $(-\pi+2\pi, \pi+2\pi]$, depending on the saturation direction. Subsequent signals $x(n+i+1)-x(n+i)$ (i=0, 1, 2, . . . ) will be in range $(-\pi, \pi]$ following standard unwrapping procedure, until $x(n+i+1)$ saturates. Together with the unwrapped phase output, a flag is used to indicate the saturation status at time n, and the adjustment direction.

For example, the flag may use 2 bits, 'b00 for "no saturation", 'b10 for "saturated and adjusted by $-2\pi$", and 'b11 for "saturated and adjusted by $+2\pi$".

HPF Handling

If the HPF is an IIR (infinite impulse response) filter, implement using cascaded $2^{nd}$ order direct-form I (DF-I). If the unwrapped phase is adjusted because of saturation, then increase or decrease $x(n-1)$ and $x(n-2)$ by the same amount as that applied to $x(n)$.

For example, with new phase input $x(n)$ and saturation flag 'b01, which means $x(n)$ was decreased by $2\pi$ to avoid saturation, $x(n-1)$ and $x(n-2)$ in the DF-I structure needs to be replaced by $x'(n-1)=x(n-1)-2\pi$ and $x'(n-2)=x(n-2)-2\pi$ respectively, and $x(n)$, $x'(n-1)$ will be used in next cycle's operation.

If the HPF is an FIR (finite impulse response) filter in the form of:

$Y(n)=\sum_{m=-N}^{N}a_m \cdot x(n+m)=\sum_{m=-N}^{-1}a_m \cdot x(n+m)+a_0 \cdot x(n)+\sum_{m=1}^{N}a_m \cdot x(n+m),$ then form $\in[-N, -1]$, $x(n+m)$ will be replaced by $x'(n+m)=x(n+m)+/-2\pi$, and $$Y(n) = \sum_{m=-N}^{-1} a_m \cdot x'(n+m) + \sum_{m=0}^{N} a_m \cdot x(n+m)$$

At this point we emphasize some distinctive features of the inventive method.

First, at the phase unwrapping module, when the output signal exceeds the supported range, it will be moved back in range by adding $N \cdot 2\pi$, where N is negative or positive integer, depends on the changing direction.

Second, the adjusted phase, together with a flag signal, are outputted to the HPF.

Third, the buffered $x(n-m)$ where m=0, 1, 2, . . . in the HPF are replaced by $x'(n-m)=x(n-m)+N \cdot 2\pi$, to eliminate the spike and subsequent ripple caused by the added step.

Figure 3A:
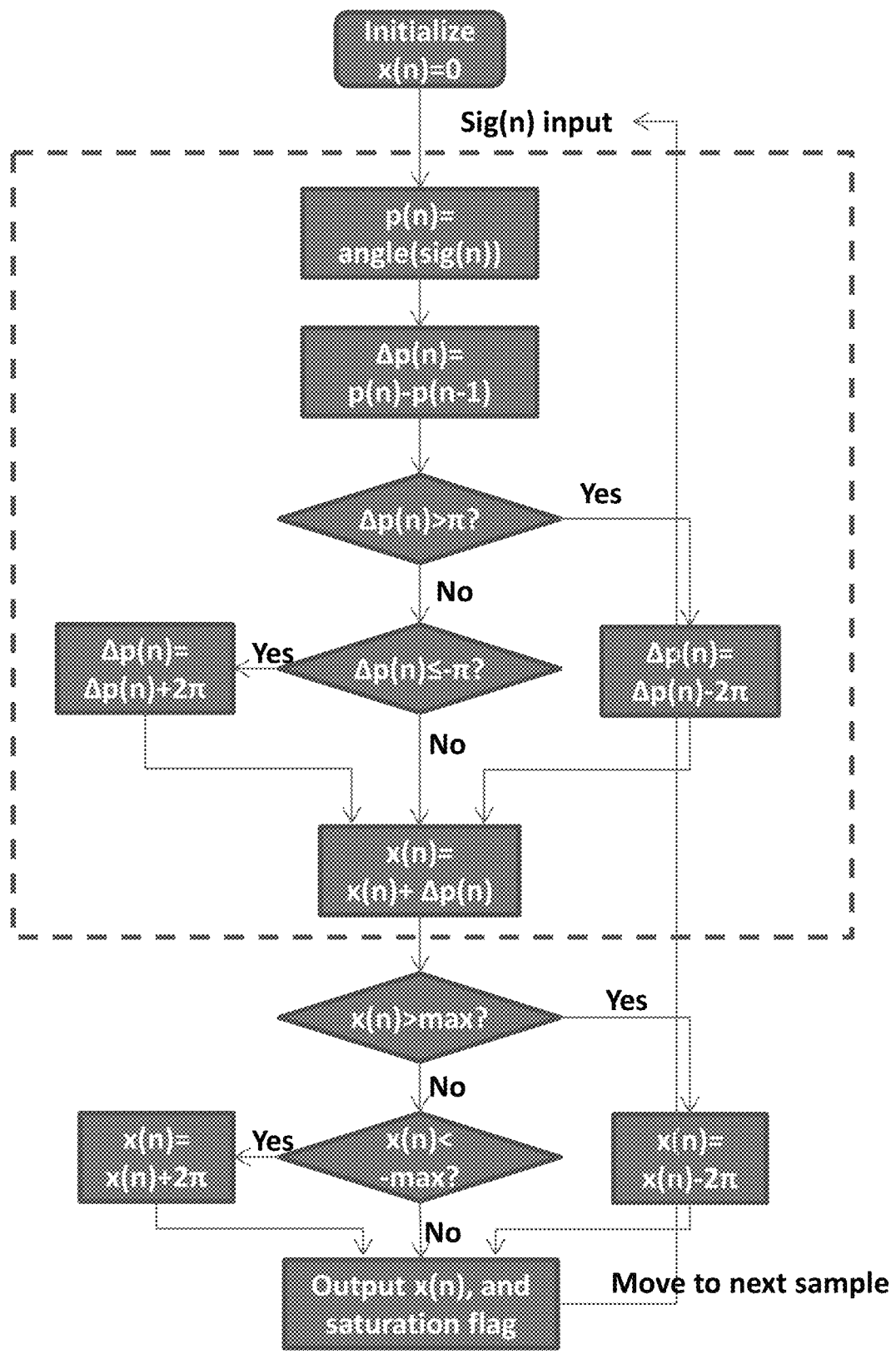
FIG. 3(A), and FIG. 3(B) are a pair of flow charts showing illustrative processing steps of a method according to aspects of the present disclosure.
Figure 3B:
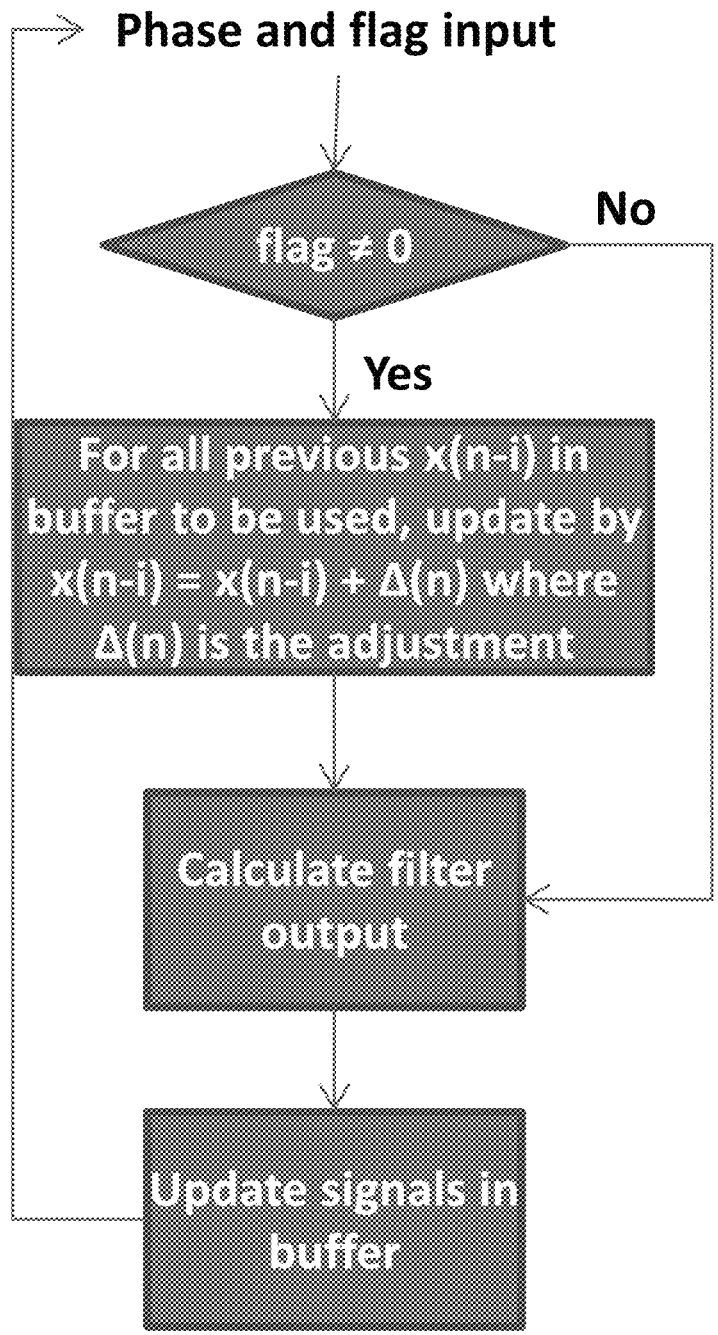

FIG. 3(A), and FIG. 3(B) are a pair of flow charts showing illustrative processing steps of a method according to aspects of the present disclosure.

With reference to those figures, it may be observed in FIG. 3(A) that functions include a tan ( ) and phase unwrapping, using input signal sig(n) from differential beating. The input sig(n) is complex type, from which the angle is calculated using a tan $$\left(\frac{imag(sig(n))}{real\ (sig(n))}\right)$$

and converted to $(-\pi, \pi]$ range.

Following the angle output is standard phase unwrapping as known an in prior art, to have $x(n)-x(n-1)\in(-\pi, \pi]$. In addition to that unwrapping, the method of the present disclosure checks whether the output phase overflows. If it exceeds positive maximum, the output value will be subtracted by $2\pi$; if exceeds negative maximum, the output value will be increased by $2\pi$. Alternatively, the applied adjustment can be $N \cdot 2\pi$, so that the output phase falls in $(-\pi, \pi]$ range. This updated $x(n)$ and the adjustment $\Delta(n)$ (expressed by a flag signal) are outputted to a high-pass filter.

FIG. 3(B) is a flow chart illustrating an operation of the high pass filter. One distinguishing feature of its operation as compared to the prior art is that our inventive method according to the present disclosure—when overflow occurs—all buffered input signals from previous cycles (i.e., $x(n-i)$, i=1, 2, . . . , N) inside the filter are adjusted by $\Delta(n)$.

Coherent detection of Rayleigh backscattered signal(s) in DAS first uses differential beating by calculating $X(c, n) \cdot X(c-l, n)^*$ where l is called the "beating taps", which is the number of samples between two locations along a length of sensor fiber. The phase of this beating product is linear to the total stress at time n in between the two locations.

Figure 4:
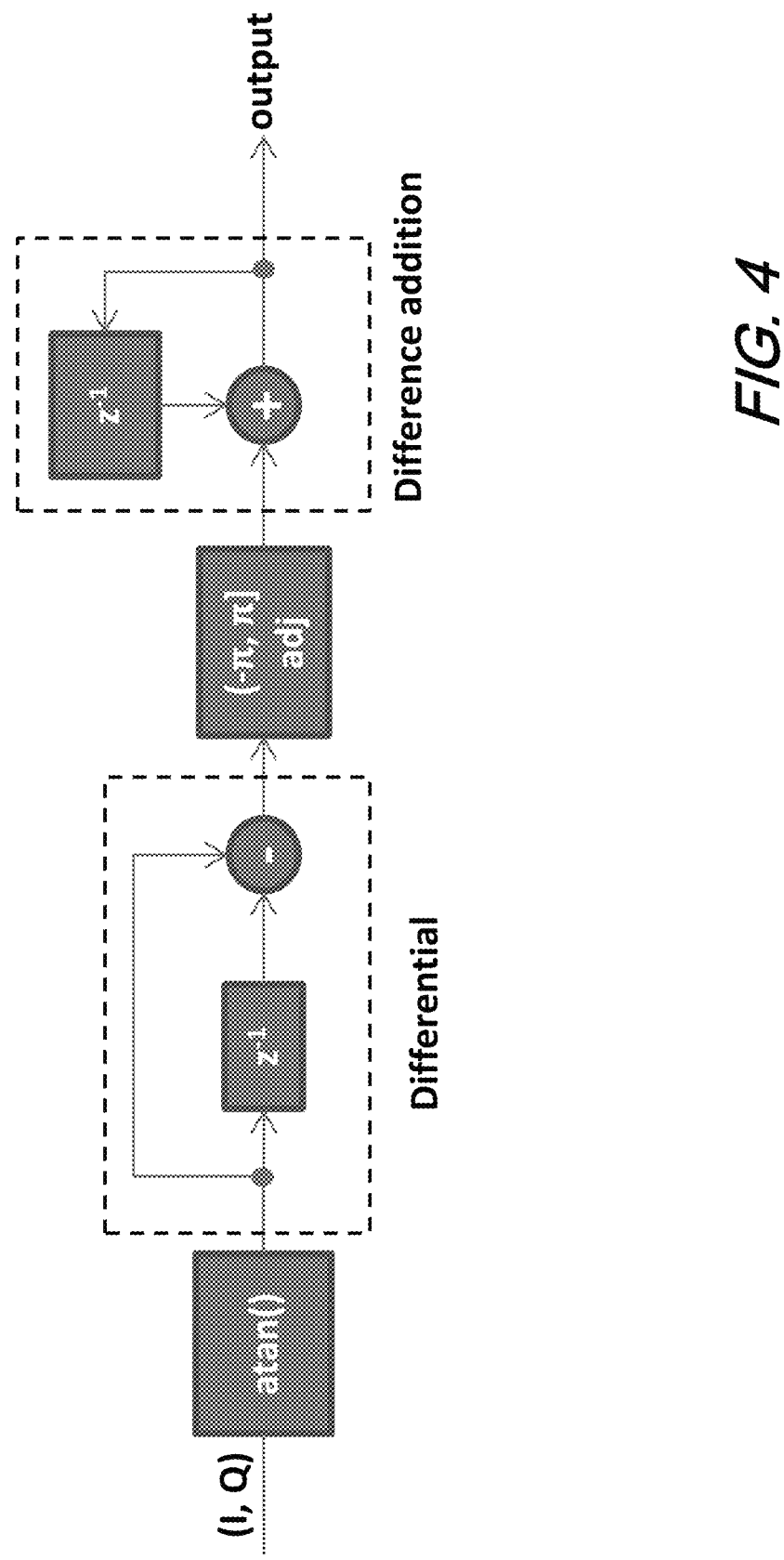
FIG. 4 is schematic diagram illustrating phase unwrap as performed in the prior art.

FIG. 4 is schematic diagram illustrating phase unwrap as performed in the prior art—based on the assumption that the difference of every two signals does not exceed $\pi$. It first calculates the angle $\varphi(n)$ in range of $(-\pi, \pi]$ from the complex product using a tan( ), then subtracts with the previous angle ($\varphi(n-1)$ from $z^{-1}$, a single-tap delay line, or register) and changes the difference to within $(-\pi, \pi)$ range by either $+2\pi$ or $-2\pi$ if necessary. The difference is then added to the previous unwrapped output $x(n-1)$ to have output $x(n)$. This process makes $x(n)-x(n-1)$ fall in $(-\pi, \pi]$ range.

Because of limited number of bits in digital signal processing, the unwrapped signal $x(n)$ may overflow. Such overflow either causes signal saturation (thus zero output after passing through a high pass filter), or generates a strong spike and long ripple if forced back into the normal range.

The method according to the present disclosure moves the unwrapped signal back into the normal range when overflow happens.

To better understand, let the supported range be [neg_max, pos_max], where neg_max<0, pos_max>0, and the unwrapped phase overflows at sample n. That is, $-\pi<x(n)-x(n-1)<\pi$, neg_max≤x(n-1)≤pos_max, while $x(n)>$pos_max or $x(n)<$neg_max.

The method according to the present disclosure uses $x'(n)=x(n)-\Delta(n)$ where:

$$\Delta(n) = \begin{cases} 2\pi \text{ or } N \cdot 2\pi & \text{when } x(n) > \text{pos\_max} \\ -2\pi \text{ or } -N \cdot 2\pi & \text{when } x(n) < \text{neg\_max} \end{cases}$$

Here $N \cdot 2\pi \leq$ pos_max $<(N+1) \cdot 2\pi$. The output replaces $x(n)$ by $x'(n)$.

Figure 5:
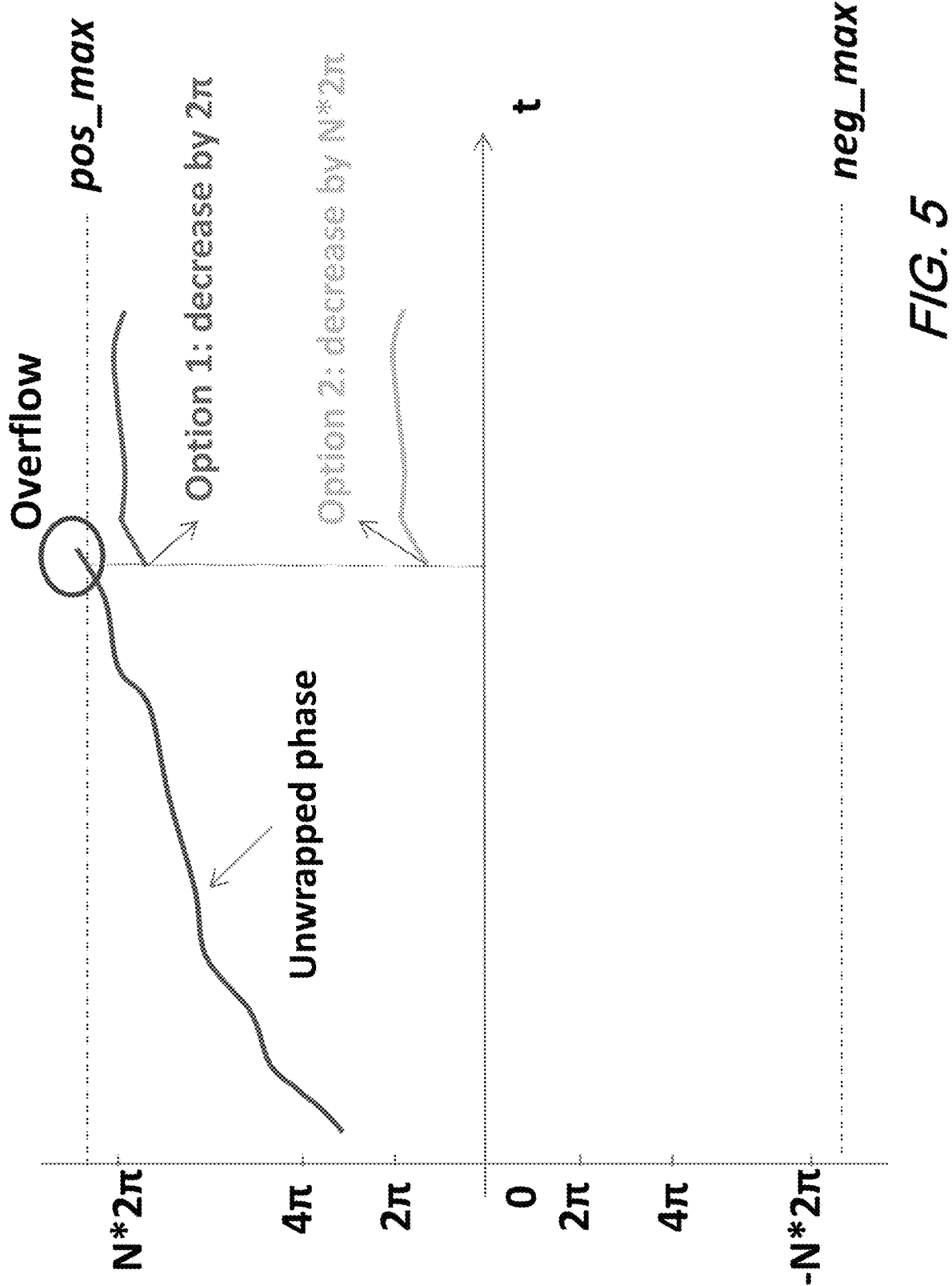
FIG. 5 is a plot illustrating an unwrapped phase handling when an overflow occurs according to aspects of the present disclosure.

FIG. 5 is a plot illustrating an unwrapped phase handling when an overflow occurs according to aspects of the present disclosure. As the example in this figure shows, when $x(n)$ becomes larger than pos_max, the output will use $x(n)=x(n)-\Delta(n)$ where $\Delta(n)=2\pi$ or $N \cdot 2\pi$ as shown in the two options. This adjusted signal $x(n)$ will be outputted together with a flag f(n), indicating the overflow and the direction (positive or negative) of the overflow. For example, f(n) may use 2 bits, one bit to indicate whether it overflows ('b1) or not ('b0), and the second bit for positive ('b0) or negative ('b1) direction. Both $x(n)$ and $f(n)$ are inputted to the HPF block.

The HPF can be either IIR or FIR. In IIR case, it's known that any higher order filters can be implemented by cascading multiple $2^{nd}$ order IIR filters. A $2^{nd}$ order IIR filter can be expressed as:

$$y(n)=b_0x(n)+b_1x(n-1)+b_2x(n-2)-a_1y(n-1)-a_2y(n-2)$$

There are two options in implementing a $2^{nd}$ order IIR filter: direct-form I (DF-I), or direct-form II (DF-II). DF-I implementation has the advantage in that there is no possibility of internal filter overflow, as long as the final result $y(n)$ is in range. This makes it more suitable in hardware implementation and is the option taken in present invention.

Figure 6:
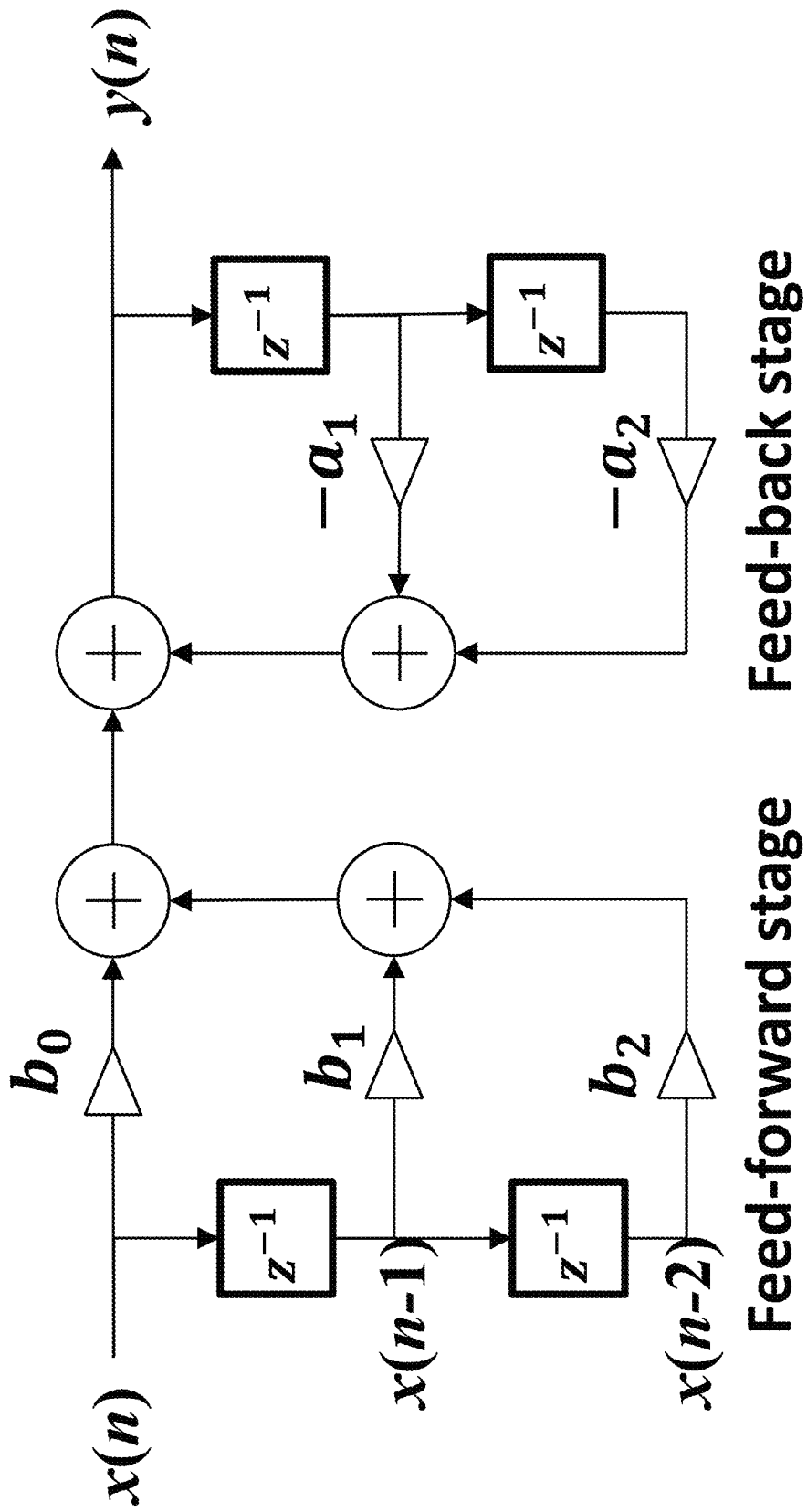
FIG. 6 is a schematic diagram illustrating direct-form IIR filter as performed in the prior art.

FIG. 6 is the implementation of DF-I filter, which is the direct mapping of the above equation.

When unwrapped phase encounters overflow, the present invention changes the operation in the feed-forward stage of the first $2^{nd}$ order IIR, by subtracting $\Delta(n)$ to its buffered $x(n-1)$ and $x(n-2)$. That is, $x'(n-1)=x(n-1)-\Delta(n)$, $x'(n-2)=x(n-2)-\Delta(n)$, and $$y(n)=b_0x(n)+b_1x'(n-1)+b_2x'(n-2)-a_1y(n-1)-a_2y(n-2)$$

Figure 7:
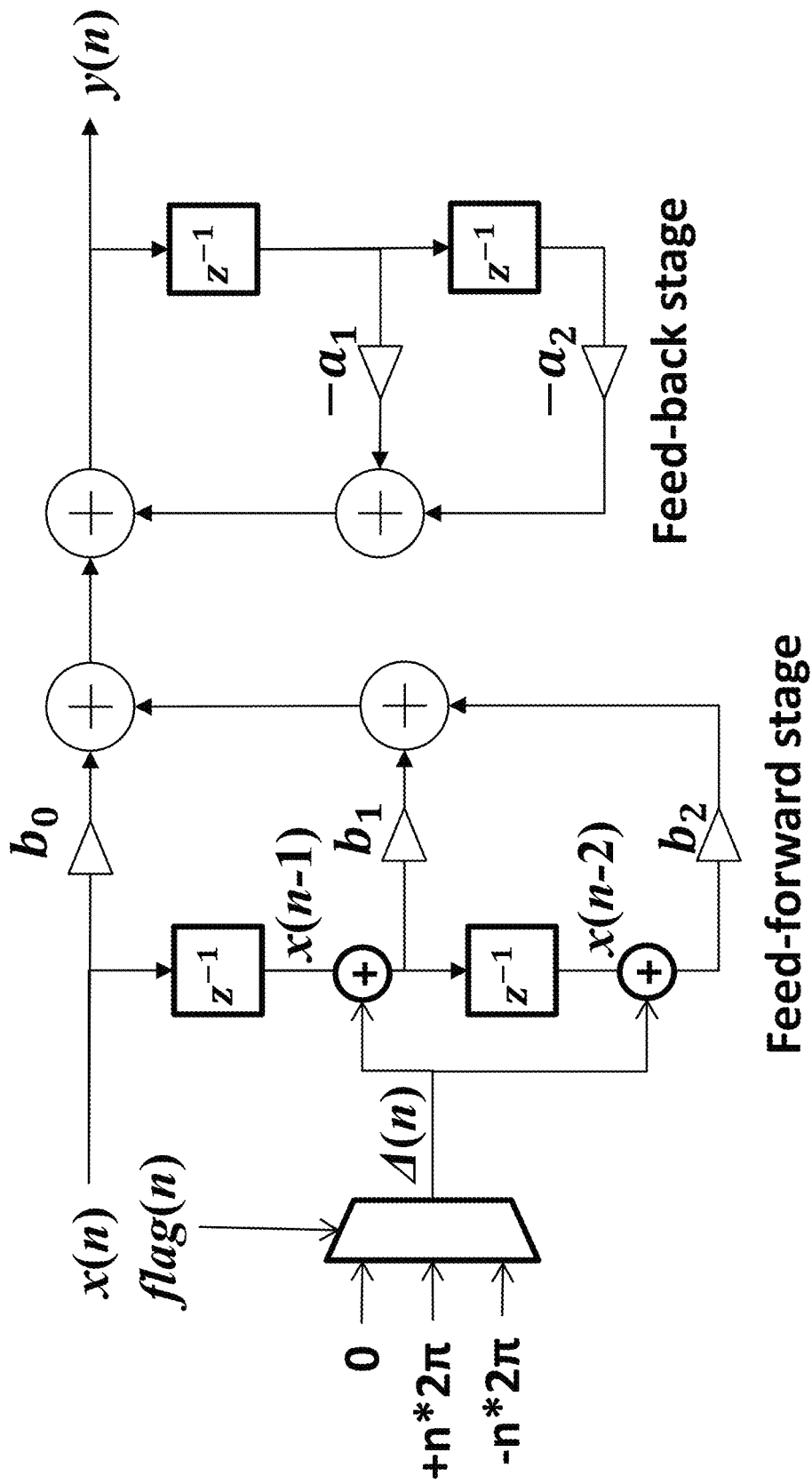
FIG. 7 is a schematic diagram illustrating an example implementation of a first $2^{nd}$ order DF-I IIR filter according to aspects of the present disclosure.

Both feed-back stage and the following $2^{nd}$ order IIR filters remain unchanged. This method is illustrated in FIG. 7, in comparison with prior art of FIG. 6, for the first 2nd order IIR filter in a chain.

Similar for an FIR filter, $$Y(n)=\Sigma_{m=-N}^{N}a_m \cdot x(n+m)=\Sigma_{m=-N}^{-1}a_m \cdot x(n+m)+a_0 \cdot x(n)+\Sigma_{m=1}^{N}a_m \cdot x(n+m),$$

if $x(n)$ overflows, then form $\in[-N, -1]$, $x(n+m)$ will be replaced by $x'(n+m)=x(n+m)-\Delta(n)$, and $$Y(n) = \sum_{m=-N}^{-1} a_m \cdot x'(n+m) + \sum_{m=0}^{N} a_m \cdot x(n+m)$$

Figure 8:
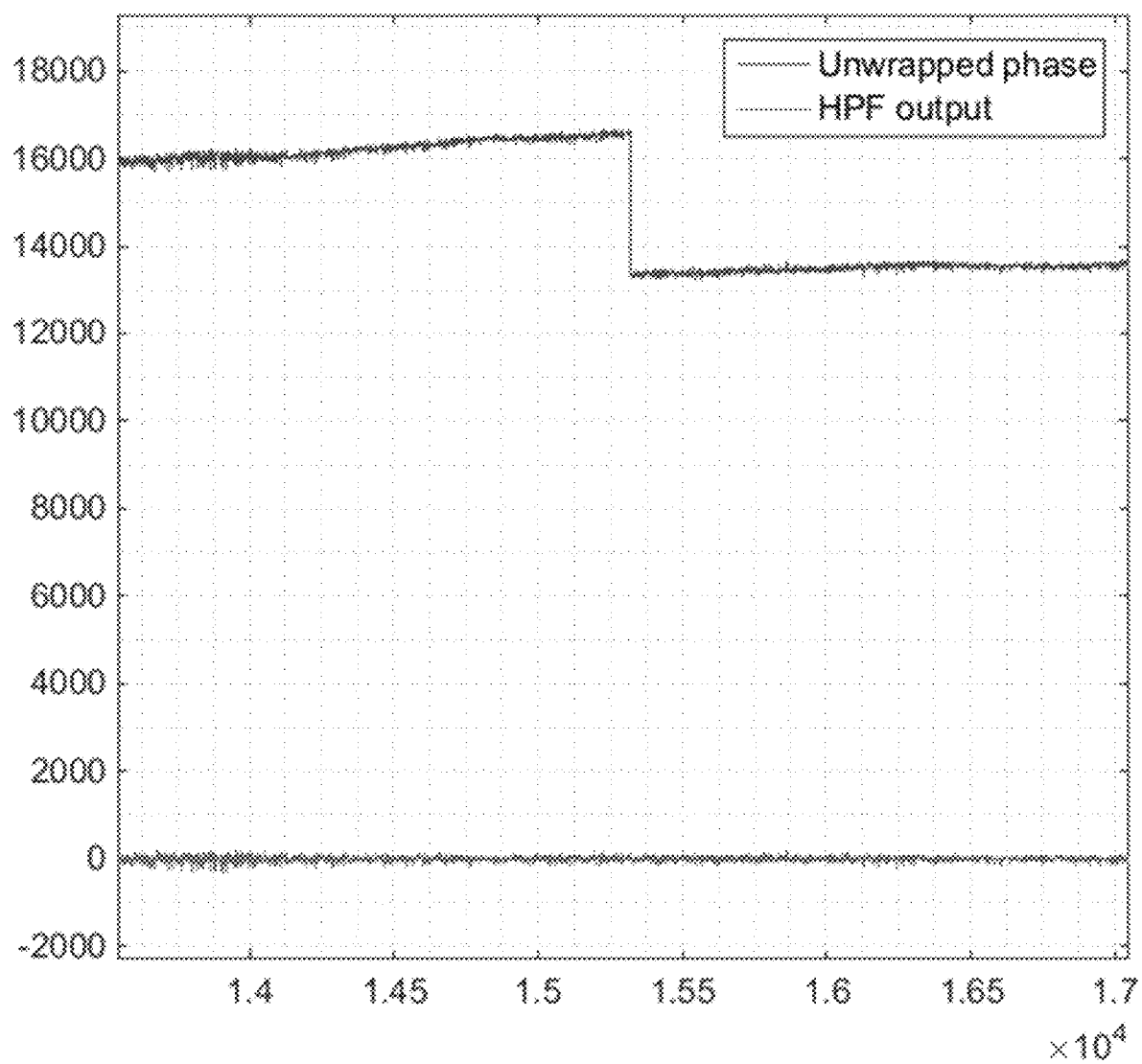
FIG. 8 is a plot showing improved HPF output according to aspects of the present disclosure.

FIG. 8 is a plot showing improved HPF output according to aspects of the present disclosure from the above method of the instant disclosure using the same data as input for FIG. 2. As can be readily observed from this figure, the spike and ripple are both removed.

Figure 9:
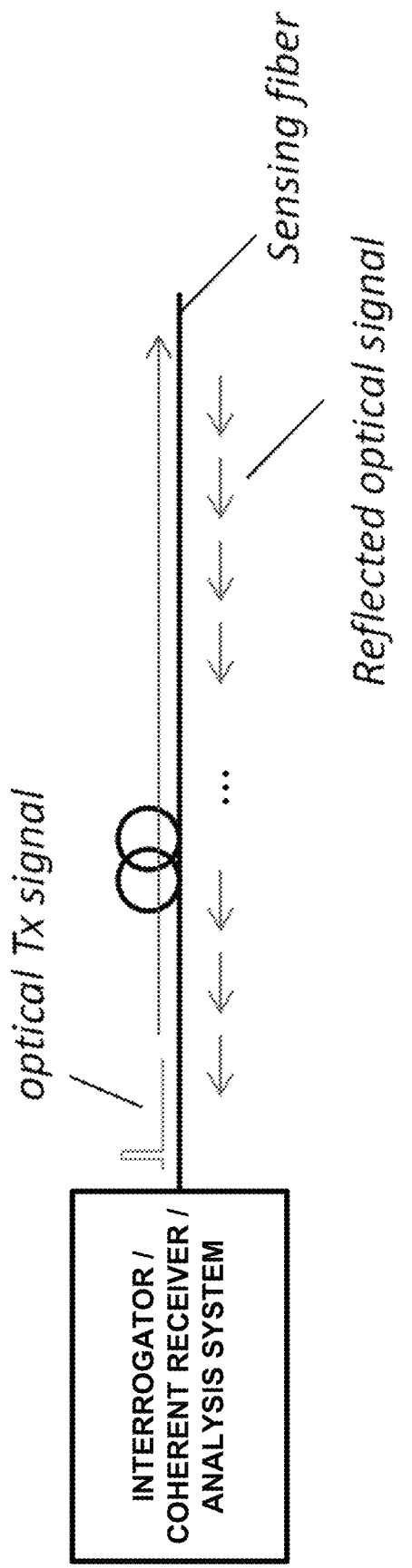
FIG. 9 is a schematic block diagram of an illustrative DFS system including interrogator and coherent receiver and analysis system according to aspects of the present disclosure.

FIG. 9 is a schematic block diagram of an illustrative DFS system including interrogator and coherent receiver and analysis system according to aspects of the present disclosure.

While we have presented this disclosure using some specific examples, those skilled in the art will recognize that our teachings are not so limited. Accordingly, this disclosure should be only limited by the scope of the claims attached hereto.

The invention claimed is:

1. A distributed optical fiber sensing (DOFS)/distributed acoustic sensing (DAS) method for a DOFS/DAS system having
    a length of optical fiber; and
    an optical interrogator unit that generates optical pulses, introduces the generated optical pulses into the optical fiber and receives a sequence of Rayleigh reflected signals from the optical fiber; and
    a coherent receiver unit configured to extract information from the sequence of Rayleigh reflected signals;
    the method comprising:
    operating the DOFS/DAS system to obtain a sequence of beating products for a plurality of locations along the length of the optical fiber;
    determining if a phase difference between every two samples in the sequence results in an overflow condition; and
    adjusting any determined overflow phase difference to a normal value by increasing or decreasing any determined overflow phase difference by a fixed value;
    outputting a flag to indicate the overflow condition and a direction of the overflow condition; and
    providing the adjusted phase difference and flag to a filter for DC removal;
    wherein the fixed value is one selected from a group consisting of $2\pi$ and $2N\pi$, where $2N\pi \leq$a supported range of normal values and $2(N+1)\pi \geq$a supported range of normal values and N is an integer number.

2. The method of claim 1 wherein the filter is a high-pass filter having infinite impulse response (IIR) that is implemented using cascaded $2^{nd}$ order IIR sub-filters.

3. The method of claim 2 wherein a first $2^{nd}$ order IIR filter is a direct-form expressed as:

$$Y(n)=\Sigma_{m=-N}^{N}a_m \cdot x(n+m)=\Sigma_{m=-N}^{-1}a_m \cdot x(n+m)+a_0 \cdot x(n)+\Sigma_{m=1}^{N}a_m \cdot x(n+m),$$

such that if $x(n)$ overflows, then for $m\in[-N, -1]$, $x(n+m)$ is replaced by $x'(n+m)=x(n+m)-\Delta(n)$, and $$Y(n)=\Sigma_{m=-N}^{-1}a_m \cdot x'(n+m)+\Sigma_{m=0}^{N}a_m \cdot x(n+m).$$

4. The method of claim 1 wherein the filter is a high-pass filter having a finite impulse response (FIR) and any samples prior to x(n) in the sequence are all adjusted by a same value as phase unwrapping.

\* \* \* \* \*